US006823477B1

(12) United States Patent
Cheng et al.

(10) Patent No.: US 6,823,477 B1
(45) Date of Patent: Nov. 23, 2004

(54) METHOD AND APPARATUS FOR A SEGREGATED INTERFACE FOR PARAMETER CONFIGURATION IN A MULTI-PATH FAILOVER SYSTEM

(75) Inventors: Eric Cheng, San Ramon, CA (US); Yafu Ding, Milpitas, CA (US); Chang-Tying Wu, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 587 days.

(21) Appl. No.: 09/768,860

(22) Filed: Jan. 23, 2001

(51) Int. Cl.[7] ................................................ G06F 11/00
(52) U.S. Cl. .............................. 714/26; 714/4; 714/3; 710/316
(58) Field of Search ............................ 714/7, 3, 4, 26; 710/316; 345/735, 736

(56) References Cited

U.S. PATENT DOCUMENTS

| | | | | |
|---|---|---|---|---|
| 5,790,775 A | * | 8/1998 | Marks et al. ................... 714/9 |
| 6,408,348 B1 | * | 6/2002 | Blount et al. .................. 710/38 |
| 6,538,669 B1 | * | 3/2003 | Lagueux et al. ............. 345/764 |
| 6,601,128 B1 | * | 7/2003 | Burton et al. ................ 710/316 |
| 6,609,213 B1 | * | 8/2003 | Nguyen et al. ................. 714/4 |
| 6,625,747 B1 | * | 9/2003 | Tawil et al. .................... 714/6 |
| 6,636,239 B1 | * | 10/2003 | Arquie et al. ................ 345/736 |
| 2001/0016904 A1 | * | 8/2001 | Hall .............................. 713/1 |
| 2002/0188711 A1 | * | 12/2002 | Meyer et al. ................ 709/223 |

OTHER PUBLICATIONS

Andrew S. Tanenbaum, Modern Operating Systems, 2001, Prentice–Hall, Second Edition, pp. 288–290 and 779.*

* cited by examiner

Primary Examiner—Scott Baderman
Assistant Examiner—Marc M Duncan
(74) Attorney, Agent, or Firm—Martine & Penilla, LLP (57) ABSTRACT

An invention is disclosed for a segregated user interface for parameter configuration in a multi-path failover system. The segregated user interface includes a user interface module capable of receiving configuration parameters for the multi-path failover system from a user. Further included is an object module that is capable of receiving the configuration parameters from the user interface module. The object module provides functionality and can detect the current controller status of controllers and the current device status of devices. In addition, the object module is capable of configuring a failover driver using the configuration parameters received from the user interface module.

20 Claims, 12 Drawing Sheets

METHOD AND APPARATUS FOR A SEGREGATED INTERFACE FOR PARAMETER CONFIGURATION IN A MULTI-PATH FAILOVER SYSTEM

CROSS REFERENCE To RELATED APPLICATIONS

This application is related to: (1) U.S. patent application Ser. No. 09/768,957, filed 23 Jan. 2001, entitled "INTELLIGENT LOAD BALANCING FOR A MULTI-PATH STORAGE SYSTEM;" and (2) U.S. patent application Ser. No. 09/768,859, now U.S. Pat. No. 6,769,071, filed 23 Jan. 2001, entitled "METHOD AND APPARATUS FOR INTELLIGENT FAILOVER IN A MULTI-PATH SYSTEM." Each of these disclosures is incorporated herein by reference in its entirety.

BACKGROUND OF THE INVENTION

1. Field of the Invention

This invention relates generally to computer storage, and more particularly to failover techniques for multi-path storage systems.

2. Description of the Related Art

Computer storage systems, such as disk drive systems, have grown enormously in both size and sophistication in recent years. These systems typically include many large storage units controlled by a complex multi-tasking controller. Large scale computer storage systems generally can receive commands from a large number of host computers and can control a large number of mass storage elements, each capable of storing in excess of several gigabytes of data.

Figure 1:
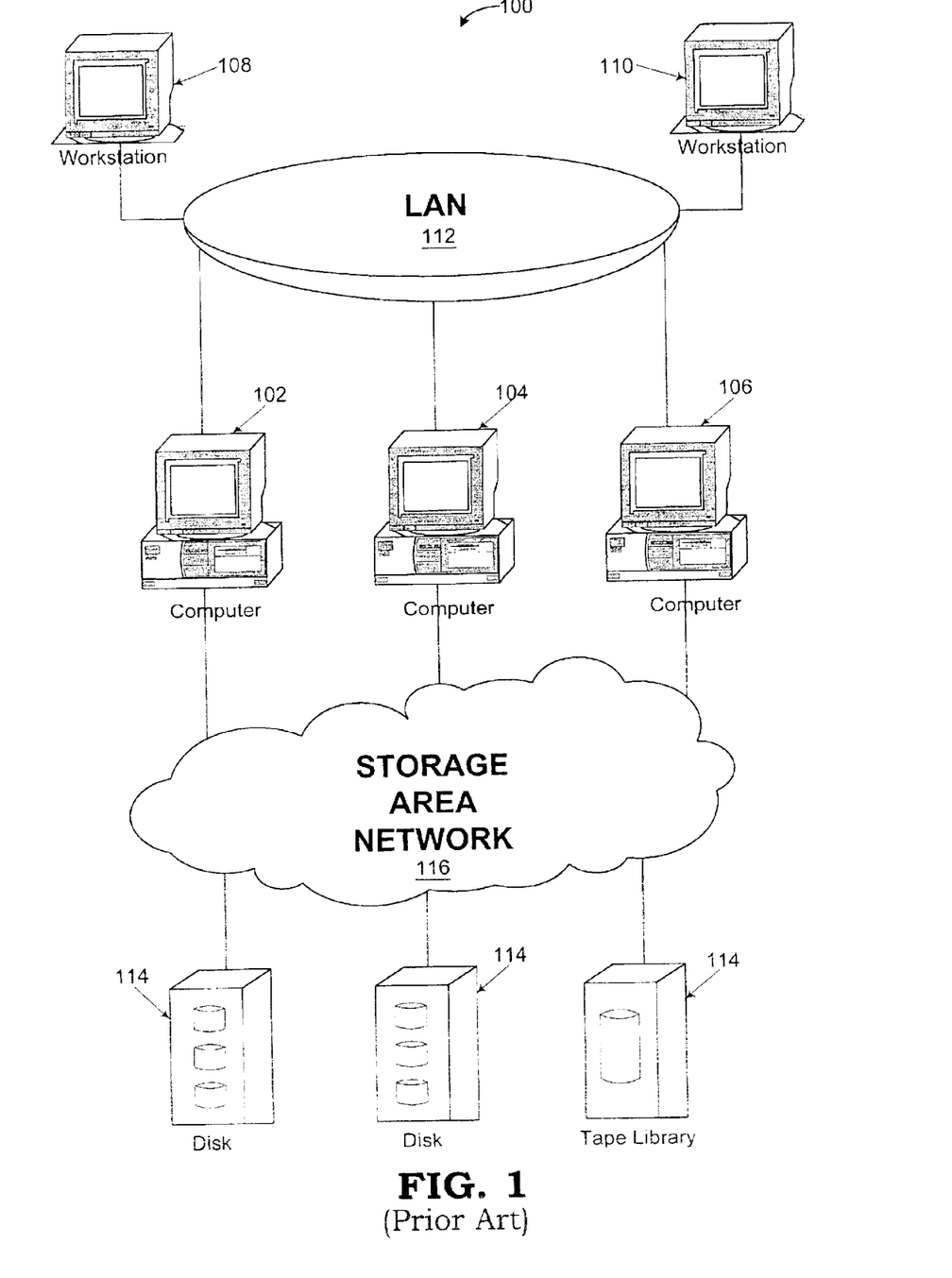
FIG. 1 is an illustration showing a prior art computer storage system.

FIG. 1 is an illustration showing a prior art computer storage system 100. The prior art computer storage system 100 includes computer systems 102, 104, and 106, and workstations 108 and 110 all coupled to a local area network 112. The computer systems 102, 104, and 106 are also in communication with storage devices 114 via a storage area network 116. Generally, the computer systems 102, 104, and 106 can be any computer operated by users, such as PCs, Macintosh, or Sun Workstations. The storage devices can be any device capable of providing mass electronic storage, such as disk drives, tape libraries, CDs, or RAID systems.

Often, the storage area network 116 is an Arbitrated Loop, however, the storage area network 116 can be any storage area network capable of providing communication between the computer systems 102, 104, and 106, and the computer storage devices 114. Another typical storage area network is a Fabric/switched storage area network, wherein the storage area network 116 comprises several nodes, each capable of forwarding data packets to a requested destination.

In use, the computer systems 102, 104, and 106 transmit data to the storage devices 114 via the storage area network 116. The storage devices 114 then record the transmitted data on a recording medium using whatever apparatus is appropriate for the particular medium being used. Generally the conventional computer storage system 100 operates satisfactorily until a failure occurs, which often results in data loss that can have catastrophic side effects.

It is more than an inconvenience to the user when the computer storage system 100 goes "down" or off-line, even when the problem can be corrected relatively quickly, such as within hours. The resulting lost time adversely affects not only system throughput performance, but also user application performance. Further, the user is often not concerned whether it is a physical disk drive, or its controller that fails, it is the inconvenience and failure of the system as a whole that causes user difficulties.

As the systems grow in complexity, it is increasingly less desirable to have interrupting failures at either the device or at the controller level. As a result, efforts have been made to make systems more reliable and increase the mean time between failures. For example, redundancy in various levels has been used as a popular method to increase reliability. Redundancy has been applied in storage devices, power supplies, servers, and in host controllers to increase reliability.

A problem with incorporating redundancy into a computer system is that redundancy often causes additional problems with system performance and usability. For example, if redundancy in the form of multiple drive paths to a single device is used in an attempt to increase the reliability of a conventional system, the operating system is often confused into believing two separate physical drives are available to receive storage data, when only one physical drive is actually available.

In view of the foregoing, there is a need for method for failover driver configuration that allows the failover driver to continue to provide access to I/O devices when a delay path to the I/O device experiences a failure. The method should have the capability to automatically detecting device status and provide masking abilities to avoid double logical drive letters for physical drives having multi-path data access.

SUMMARY OF THE INVENTION

Broadly speaking, the present invention fills these needs by providing a segregated user interface a having front end graphical user interface and a backend object module to provide functionality to the interface. The interface allows a failover driver to be configured to re-direct input/output (I/O) requests from failed data paths to alternate data paths. In addition, the interface provides logical unit number (LUN) masking to hide redundant logical storage device paths from the operating system.

In one embodiment, a segregated user interface for parameter configuration in a multi-path failover system is disclosed. The segregated user interface includes a user interface module capable of receiving configuration parameters for the multi-path failover system from a user. Further included is an object module that is capable of receiving the configuration parameters from the user interface module. The object module provides functionality and can detect the current controller status of controllers and the current device status of devices. In addition, the object module is capable of configuring a failover driver using the configuration parameters received from the user interface module.

In another embodiment, a method is disclosed for configuring parameters in a multi-path failover system. Initially, a current controller status of a controller and the current device status of a device are detected. The current controller status and the current device status are then displayed to a user. Configuration parameters for the mult-path failover system are received from the user, often based on the displayed current controller and device status. Typically, the configuration parameters include logical unit number (LUN) masking parameters. The failover driver is then configured using the received configuration parameters.

A system for configuring parameters in a mult-path failover system is disclosed in a further embodiment of the present invention. The system includes a user interface module capable of receiving configuration parameters for the multi-path failover system from a user. Further included is an object module capable of receiving the configuration parameters from the user interface module. The object module also is capable of detecting the current controller status of the controllers and the current device status of the devices. The system also includes a failover driver, which is in communication with the object module. The failover driver can receive the configuration parameters from the object module, and is thereby configured using the received configuration parameters.

Advantageously, the embodiments of the present invention provide separation of the front and back ends of the segregated user interface, which allows either module to be modified without significantly affecting the other module. Further, the segregated user interface of the embodiments of the present invention allows easy configuration of a failover filter driver, which provides intelligent failover in multi-path computer systems, greatly increasing reliability. The ability to automatically detect failures and reroute data to alternate paths greatly increases system reliability. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a segregated user interface to configure parameters in a multi-path computer system environment. To this end, embodiments of the present invention provide a segregated user interface having a front end graphical user interface and a backend object module to provide functionality to the interface. The separation allows either module to be modified without significantly affecting the other module. The interface allows a failover driver to be configured to re-direct input/output (I/O) requests from failed data paths to alternate data paths. In addition, the interface provides logical unit number (LUN) masking to hide redundant logical storage device paths from the operating system. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 2A:
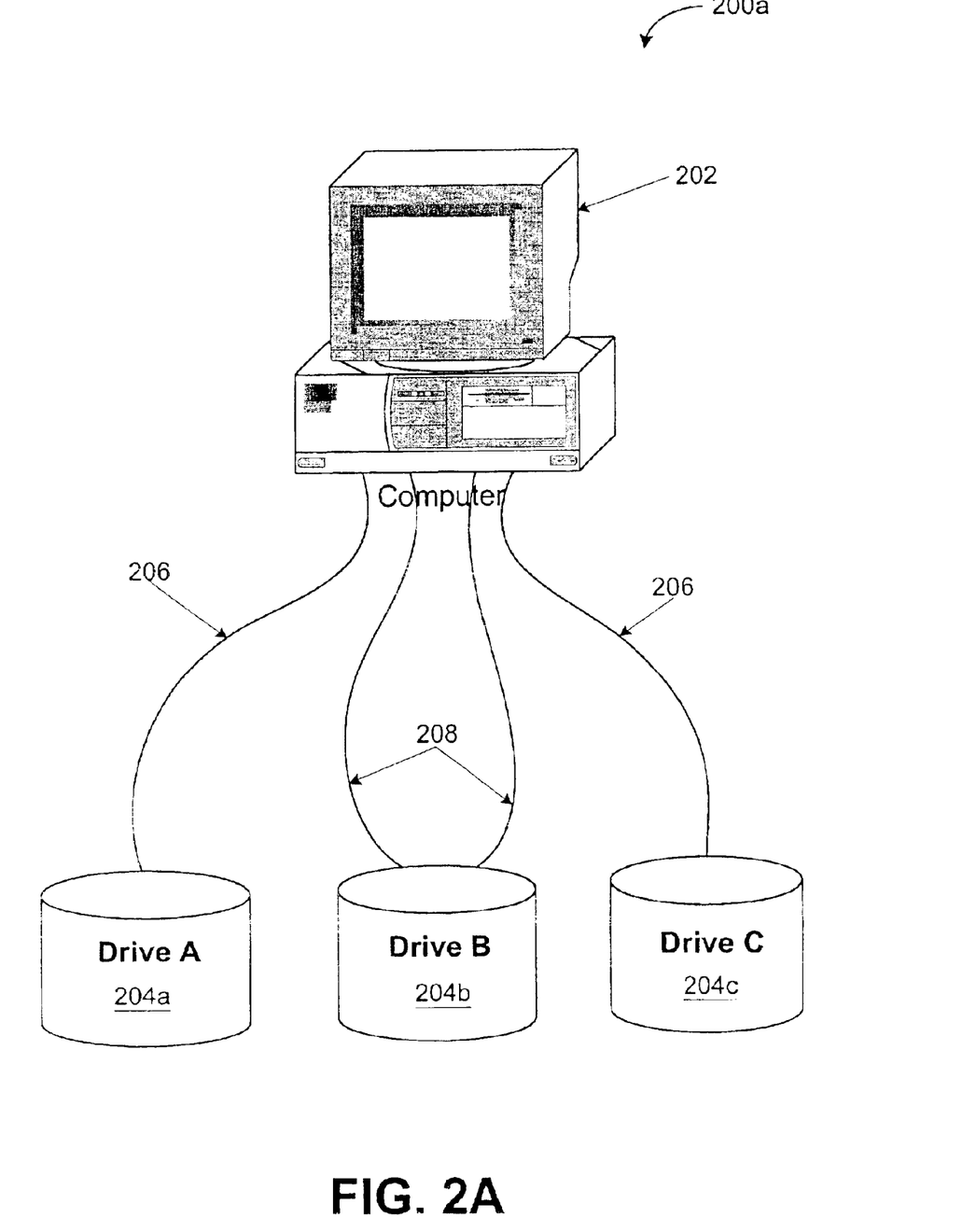
FIG. 2A is an illustration showing a computer storage system, in accordance with an embodiment of the present invention.

FIG. 2A is an illustration showing a computer storage system 200a, in accordance with an embodiment of the present invention. The computer storage system 200a includes a computer system 202 coupled to computer storage devices 204a, 204b, and 204c via data paths 206 and 208. In particular, computer storage devices 204a and 204c are coupled to the computer system 202 via single-path data paths 206, and computer storage device 204b is coupled to the computer system 202 via the multi-path data path 208.

The computer system 202 typically is any computer operated by users, such as PCs, Macintosh, or Sun Workstations. However, it should be borne in mind that the computer system 202 can actually be any type of processor that can be put in communication with the storage devices 204a, 204b, and 204c. The storage devices 204a, 204b, and 204c typically are disk drives, however, the storage devices 204a, 204b, and 204c can be any computer device capable of mass storage, such as a tape drives, CDs, or RAID systems.

The data paths 206 and 208 represent any type of data path capable of coupling the computer system 202 to the computer storage devices 204a, 204b, and 204c, such as a simple transport or computer network system. Often, the data paths 206 and 208 reside in an Arbitrated Loop, however, the data paths can also reside in any storage area network (SAN) capable of providing communication between the computer system 202 and the computer storage devices 204a, 204b, and 204c. Another typical computer network wherein the data paths 206 and 208 can reside is a Fabric/Switched SAN, wherein each data path comprises several nodes, each capable of forwarding data packets to a requested destination.

In use, the computer system 202 transmits data to the storage devices 204a and 204c via the single-path data paths 206. The storage devices 204a and 204c then record the transmitted data on their recording medium using whatever apparatus is appropriate for the particular medium being used. In addition, the computer system 202 transmits data to the storage device 204b using the multi-path data path 208. The multi-path data path 208 comprises two or more single-path data paths, each of which couples the computer system 202 to the storage device 204b.

As explained in greater detail subsequently, embodiments of the present invention utilize a failover filter driver to coordinate I/O requests between the various data paths comprising each multi-path data path 208. More particularly, the failover filter driver intercepts I/O requests from an operating system (OS) executing on the computer system 202. Each I/O request is then routed to the particular storage device 204a, 204b, or 204c desired by the OS. When the I/O request is destined for a storage device coupled to the computer system via a multi-path data path, such as data path 208, the failover filter driver determines the best data path of the plurality of data paths comprising the multi-path data path 208 to use to access the storage device.

Figure 2B:
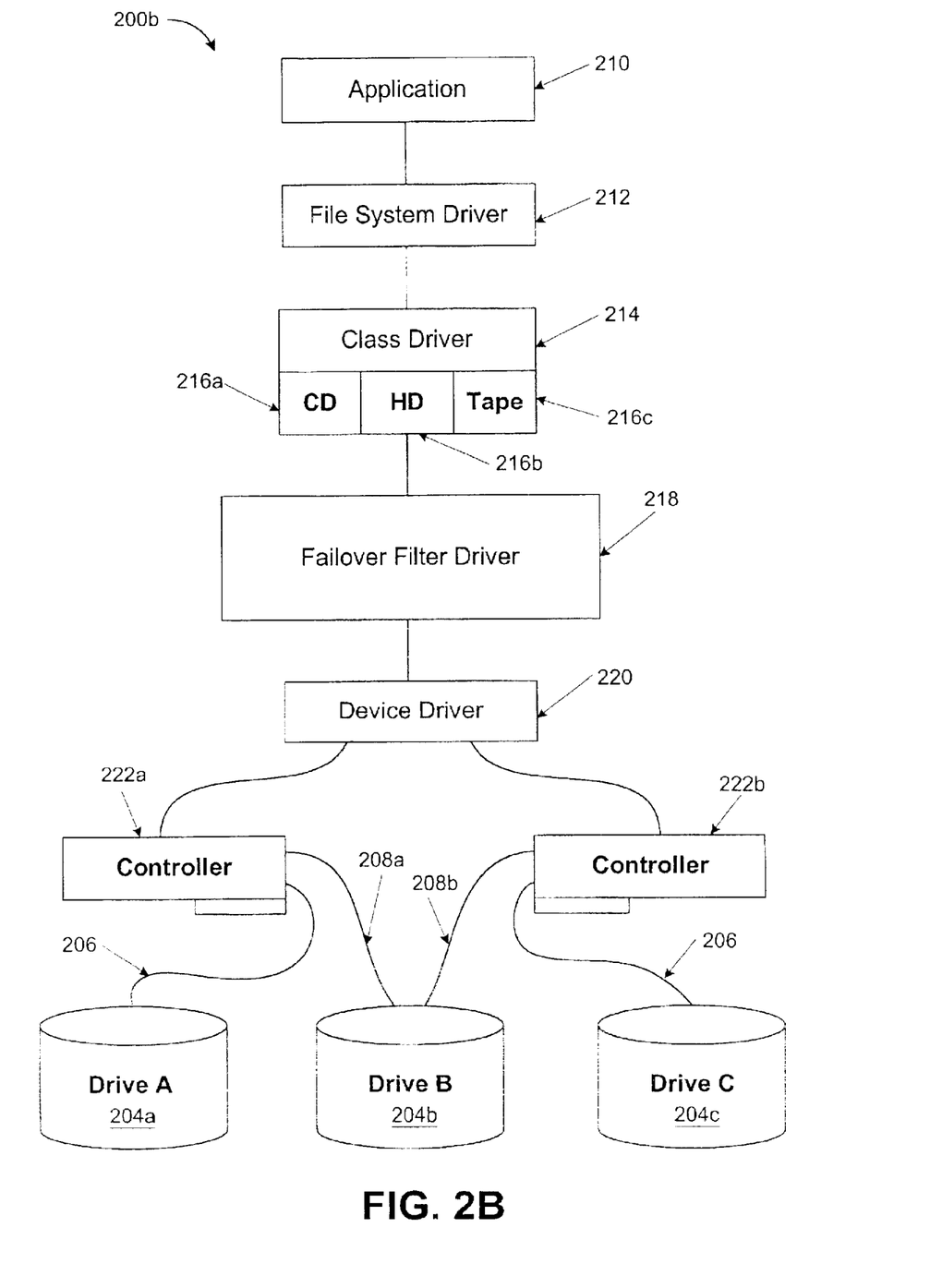
FIG. 2B is an illustration showing a multi-path computer storage system having an intelligent failover system, in accordance with an embodiment of the present invention.

FIG. 2B is an illustration showing a multi-path computer storage system 200b having an intelligent load balancing system, in accordance with an embodiment of the present invention. The multi-path computer storage system 200b includes an application program 210 executing in an OS environment having a file system driver 212. In communication with the file system driver 212 is a class driver 214. The class driver 214 is also in communication with a failover filter driver 218, which manages and delivers I/O requests to device driver 220. The device driver 220 provides communication to controllers 222a and 222b, which are coupled to, and control, storage devices 204a, 204b, and 204c.

The application program 210 can be any application program executing on the computer system comprising the computer storage system, such as a word-processing application or directory viewing application, such as WINDOWS EXPLORER. Optionally, the application program can be omitted, and the I/O requests initiated by the OS itself. The file system driver 212 helps manage the file I/O for the computer system using the class driver 214.

The class driver 214 can be any class driver designed to operate with the storage devices being used in conjunction with the computer storage system 200b. As shown in FIG. 2B, each class driver 214 is designed to operate in conjunction with a particular storage device, such as a CD 216a, a disk drive 216b, or a tape drive 216c. The device driver 220 provides the OS access to the storage devices of the computer system. Each driver is a program that interacts with a particular storage device or special type of software, and includes specialized knowledge of the device or special software interface that programs using the driver do not have. During operation, each device driver creates a device object for the device associated with the device driver. The device object defines the related device and the data path used to access the device. Hence, in use each storage device 204a, 204b, and 204c will have an associated device object, which is used by the operating system to access the associated device. More specifically, storage device 204b will have two related device objects, one for each data path 208a and 208b providing access to the storage device 204b.

Each controller 222a and 222b provides hardware management to each storage device coupled to the controller. Each controller 222a and 222b can be incorporated in the motherboard of the related computer system, or embodied on a host adapter card, as shown in FIG. 2B. When embodied on a host adapter card, the controller and attached host adapter card are fitted into a vacant slot on the motherboard and can be removed or replaced as needed by the system operator.

As explained previously, the storage devices 204a, 204b, and 204c typically are disk drives, however, the storage devices 204a, 204b, and 204c can be any computer device capable of mass storage, such as a tape drives, CDs, or RAID systems. Each storage device is coupled to the controllers 222a and 222b by data paths 206 and 208a–b, which represent any type of data path capable of coupling the controllers 222a and 222b to the computer storage devices 204a, 204b, and 204c, such as a simple transport or computer network system. As mentioned previously, the data paths 206 and 208a and 208b often reside in an Arbitrated Loop, however, the data paths can also reside in any storage area network such as a Fabric/Switched SAN, wherein each data path comprises several nodes, each capable of forwarding data packets to a requested destination.

In operation, the application program 210 accesses stored data using the OS, which sends I/O request via the file system driver 212 and the class driver 214 for the particular storage device to be accessed. For example, if the storage devices 204a, 204b, and 204c are disk drives, the class driver for disk drives 216b would be used. The I/O request is then intercepted by the failover filter driver 218, which examines the I/O request and the data paths coupling the target device to the computer system to determine which data path to use to access the requested storage device.

Specifically, the failover filter driver 218 is an intermediate kernal mode driver that exists above the device driver 220, and below the class driver 214. The failover filter driver 218 attaches any device objects it creates to the device objects created by the device driver 220. I/O requests destined for a particular device driver and associated with a device object originally created by the device driver are sent to the failover filter driver 218, which is associated with the "attached" device object. In this manner, the failover filter driver 218 is able to intercept I/O requests destined for the storage devices 204a, 204b, and 204c coupled to the computer system. The failover filter driver 218 then determines whether to block the I/O request, reroute the I/O request to an alternate data path, or pass the I/O request to the original data path.

Figure 3:
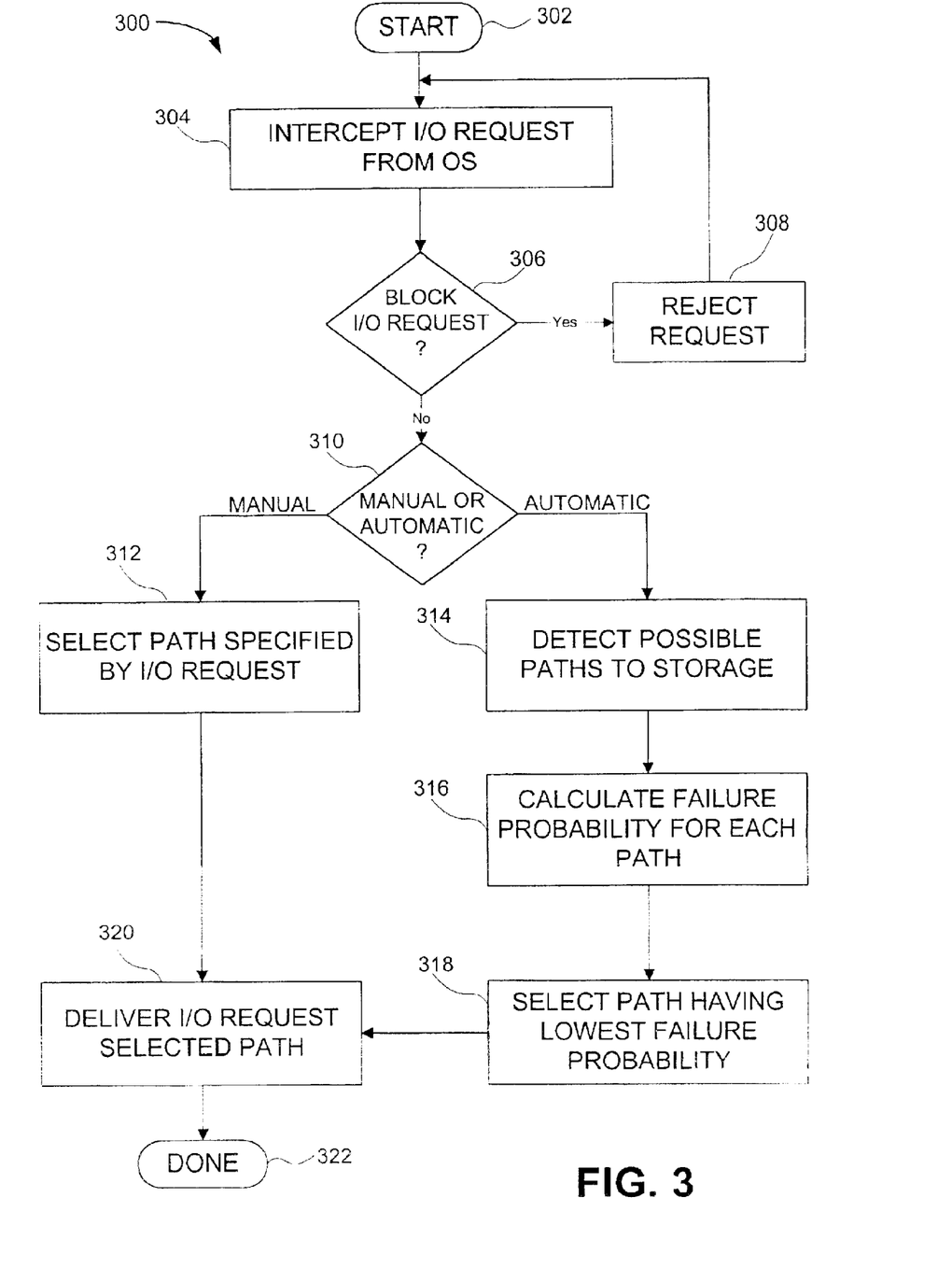
FIG. 3 is a flowchart showing a method for intelligent failover in a multi-path computer system, in accordance with an embodiment of the present invention.

FIG. 3 is a flowchart showing a method 300 for intelligent failover in a multi-path computer system, in accordance with an embodiment of the present invention. In an initial operation 302, pre-process operations are performed. Pre-process operations include provisioning the computer system and any associated computer networks, determining the set of device objects that will be under the control of the failover filter driver, and other pre-process operations that will be apparent to those skilled in the art.

In an interception operation 304, the failover filter driver intercepts an I/O request destined for a particular storage device from the OS. As mentioned previously, the failover filter driver is an intermediate kernal mode driver that exists above the device drivers, and below the class driver. The failover filter driver attaches any device objects it creates to the device objects created by the device drivers. I/O requests destined for a particular device driver and associated with a device object originally created by the device driver are sent to the failover filter driver, which is associated with the "attached" device object. In this manner, the failover filter driver is able to intercept I/O requests destined for the storage devices coupled to the computer system.

A decision is then made as to whether the I/O request should be blocked, in operation 306. Each received I/O request is associated with a particular device object, which is used by the system to perform the I/O request. The failover filter driver examines this device object to determine whether it is masked, as described in greater detail subsequently. The failover filter driver blocks I/O requests to masked device objects. If the I/O request is to blocked, the method 300 continues with a reject I/O operation 308, otherwise the method continues with operation 310.

In a reject I/O operation 308, the failover filter driver rejects the intercepted I/O request. Because the embodiments of the present invention allow devices to be accessed by multiple data paths, a single device could normally be mistaken as multiple devices by the file system. This is a result of each data path to a device causing a separate device object to be generated. The file system sees each device object as a separate physical device. Thus, embodiments of the present invention provide LUN masking to hide duplicate logical devices from the user, such that the user generally will only see one logical device for each physical device. It should be noted, however, that embodiments of the present invention can optionally not provide LUN masking for particular devices, depending on the needs of the computer system operator. Blocked I/O requests are rejected, thus hiding the blocked logical device. The method 300 then continues with another interception operation 304.

When the I/O request is not blocked, a decision is made as to whether the I/O request is set to manual-path-selecting or automatic-path-selecting, in operation 310. Embodiments of the present invention are capable of performing both a manual-select device access, which allows an application to determine the data path to access the device, or an automatic-select access, wherein the failover filter driver determines the best data path to use in accessing the device. If the I/O request is a manual I/O request, the method 300 continues with a path selection operation 312. If the I/O request is an automatic I/O request, the method 300 continues with a detection operation 314.

In the path selection operation 312, the failover filter driver selects the data path specified by the I/O request. Manual device access allows an intelligent application program to set its own data path to the storage devices. This effectively moves the data path selection logic from the failover filter driver to the application program, which provides the extra flexibility needed by some users. In this manner, specific application programs can control the data path selection manually, while others leave the path selection determination to the failover filter driver. The I/O request is then delivered to the storage device using the selected data path in operation 320.

If the I/O request is an automatic-path-selecting I/O request, the failover filter driver detects the possible paths to the storage device associated with the I/O request, in a detection operation 314. During the detection operation 314, the failover filter driver detects the status of the various data paths capable of being used to access the requested storage device. For example, referring to back to FIG. 2B, if the failover filter driver 218 intercepted an I/O request to access storage device 204b, the failover filter driver 218 would detect the status of the two data paths capable of being used to access storage device 204b. Thus, the failover filter driver 218 would detect the status of data paths 208a and 208b from controllers 222a and 222b.

Referring back to FIG. 3, the failover filter driver calculates a failure probability for each previously detected data path, in a calculation operation 316. Using the detected data obtained in the detection operation 314, the failover filter driver can determine a probability of failure for each detected data path. As described in greater detail subsequently, the failover filter driver uses both the prior and current status of each data path in calculating the probability of failure. In addition, embodiments of the present invention preferably weight the detected data to increase the accuracy of the probability calculation.

The path having the lowest probability of failure is then selected in a path selection operation 318. Having calculated the probability of failure for each detected data path, the failover filter driver then determines which of the detected data paths has the lowest probability of failure. This data path is then selected for use in transmitting the I/O request to the storage device. In this manner, failed data paths can be detected and I/O requests rerouted to alternate data paths, thus enabling continued operation of the computer storage system. The I/O request is then delivered to the storage device using the selected data path in operation 320.

Post process operations are performed in operation 322. Post process operations include network maintenance and other post process operations that will be apparent to those skilled in the art. Advantageously, the embodiments of the present invention provide intelligent failover in multi-path computer systems, which results greatly increased reliability. Since data paths can fail, either because of a failed connection, failed controller, or any other reason, the ability to automatically detect failures and reroute data to alternate paths greatly increases system reliability.

Figure 4:
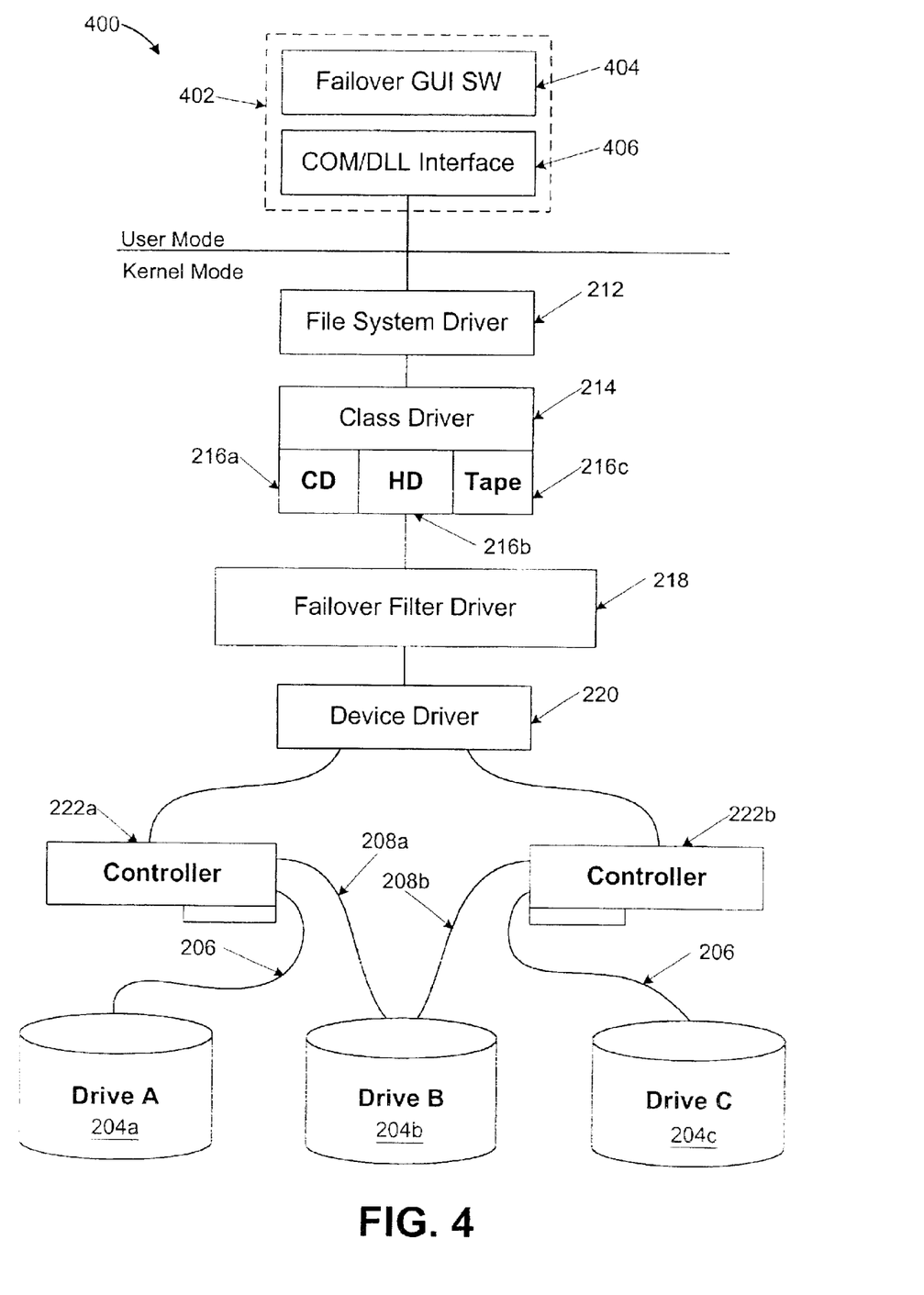
FIG. 4 is an illustration showing a multi-path computer storage system having a segregated interface to configure an intelligent failover system, in accordance with an embodiment of the present invention.

FIG. 4 is an illustration showing a multi-path computer storage system 400 having a segregated interface to configure an intelligent failover system, in accordance with an embodiment of the present invention. The multi-path computer storage system 400 includes a segregated user interface 402 executing in an OS environment having a file system driver 212. In communication with the file system driver 212 is a class driver 214. The class driver 214 is also in communication with a failover filter driver 218, which manages and delivers I/O requests to device driver 220. The device driver 220 provides communication to controllers 222a and 222b, which are coupled to, and control, storage devices 204a, 204b, and 204c.

The segregated user interface 402 comprises a failover graphical user interface (GUI) module 404 and a component object module (COM)/dynamic link library (DLL) interface module 406. The failover GUI module 404 allows the user to configure parameters for the failover filter driver 218. In one embodiment, the failover GUI module 404 uses the System Registry to store the configured parameters for the failover filter driver 218, which uses the parameters to initialize and configure the computer storage. The COM/DLL interface module 406 interfaces with the actual computer system, thus providing the segregated user interface 400 with separation, which allows changing of the failover GUI module 404 without affecting the features and functionality of the COM/DLL interface module 406. Similarly, the separation also allows changing of the features and functionality of the COM/DLL interface module 406 without affecting the failover GUI module 404.

The segregated user interface 402 provides the user access to the failover filter driver 218 settings, and further provides the user with information concerning the system and network over which the failover filter driver 218 is executing. In one embodiment, the segregated user interface 402 provides information on the network. For example, in a Fibre Channel environment the segregated user interface 402 can provide the user with information concerning the Fibre Channel host bus adapters and connecting devices controlled by the Fibre Channel host bus adapters. In addition, the segregated user interface 402 can be used to configure LUN masking and failover for the system. Further, the segregated user interface 402 can be used show failover status and statistics. Thus, the segregated user interface 402 can be used as a utility tool to help configure LUN masking and failover.

Preferably, the segregated user interface module 402 can perform a plurality of functions to assist the user in configuring and maintaining the failover filter driver and computer storage system. For example, embodiments of the present invention allow the user to view the current configuration of the system, and change the configuration, such as on LUN masking and used host bus adapters used in conjunction with the failover filter driver. In addition, the segregated user interface module 402 allows the user to save the configuration to a file and later restore the configuration from the file. Moreover, the segregated user interface module 402 allows the user to view the link status and I/O status of the system.

Figure 5:
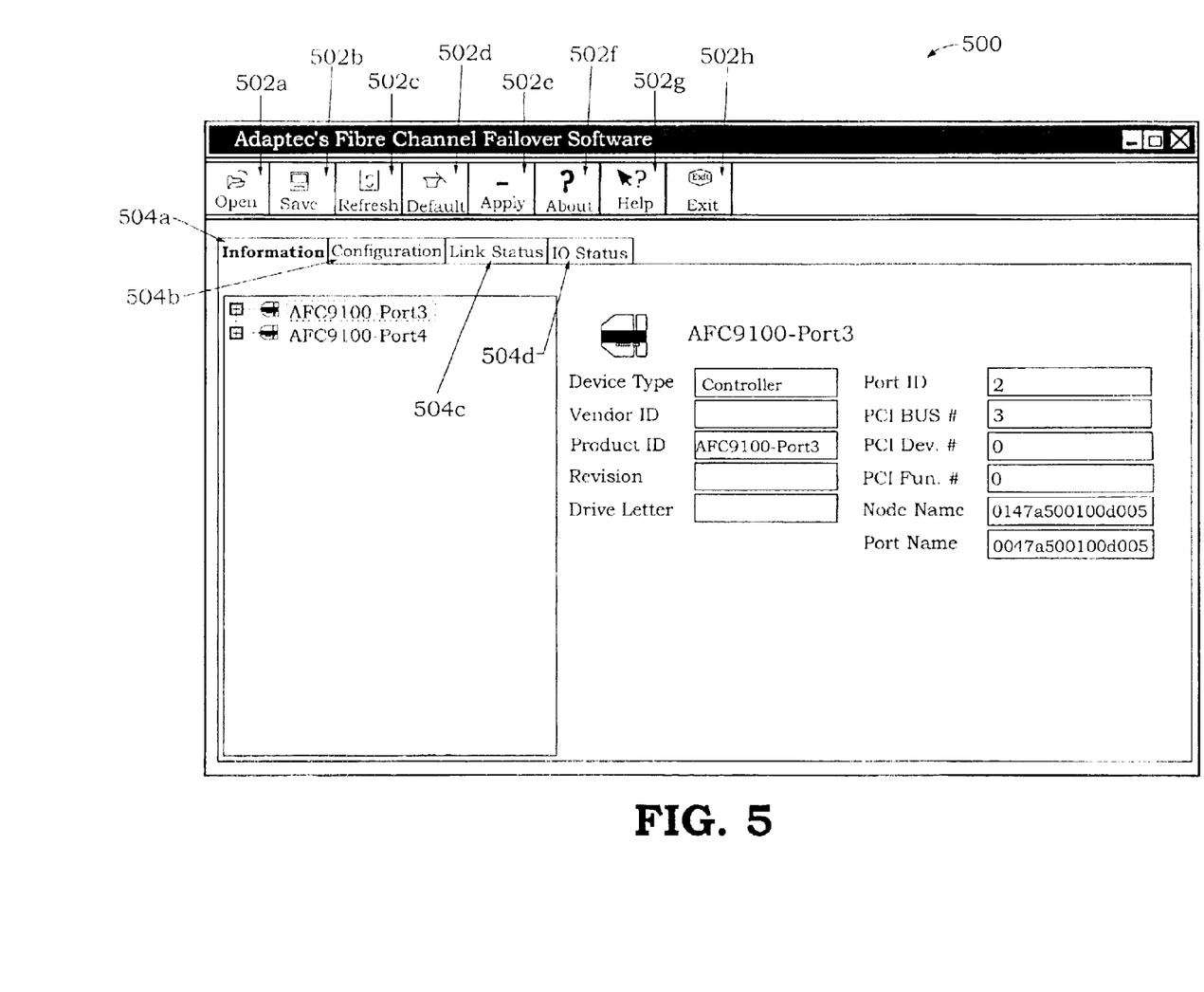
FIG. 5 is an exemplary screen shot of a failover GUI module, in accordance with an embodiment of the present invention.

FIG. 5 is an exemplary screen shot 500 of a failover GUI module, in accordance with an embodiment of the present invention. In the following examples, a Fibre Channel network configuration will be used. However, it should be noted that any protocol practice the embodiments of the present invention. As shown in FIG. 5, the failover GUI module includes eight action buttons 502a–502h, and four tabs to four different property pages 504a–504d. In operation, the user can select an action button 502a–502h to carry out a desired action. Further, the user can select one of the four tabs to the property pages 504a–504d to view information on the system.

The open action button 502a is used to open an existing configuration file. In one embodiment, a file browser is displayed in response to the user selecting the open action button 502a, allowing the user to specify which configuration file to open. One embodiment uses a ini file format to save the configuration file. Turn next to the save action button 502b, the user can save the current configuration by selecting this action button. Similar to the open action button 502a, the save action button 502b displays a file browser in response to the user selecting the save action button 502b, allowing the user to specify the file name for the configuration file. It can be saved in predetermined file format, such as the .ini file format.

The refresh action button 502c generally is used for re-scanning and displaying the current connectivity of the system. In response to a user selection of the refresh action button 502c, a message prompt is displayed and the user can confirm or cancel the re-scanning of the devices. The default action button 502d can be used to restore all the configuration settings back to the factory default.

The apply action button 502e applies the current configuration settings to the system when selected. When the user selects the apply action button 502e, a message prompt is generally displayed asking for a conformation of the action from the user. The about action button 502f can be used to display information about the software used in an embodiment, such as information that describes a product using the embodiments of the present invention. The help action button 502g is used to display help menu for the product, and the exit action button 502h is used to exit the program. Generally, a message prompt will be displayed asking if the user desires to quit after selection of the exit action button 502h. As described in greater detail subsequently, the four property pages 504a–504d accessible via the four tab buttons are the information page 504a, the configuration page 504b, the link status page 504c, and the I/O status page 504d.

Figure 6A:
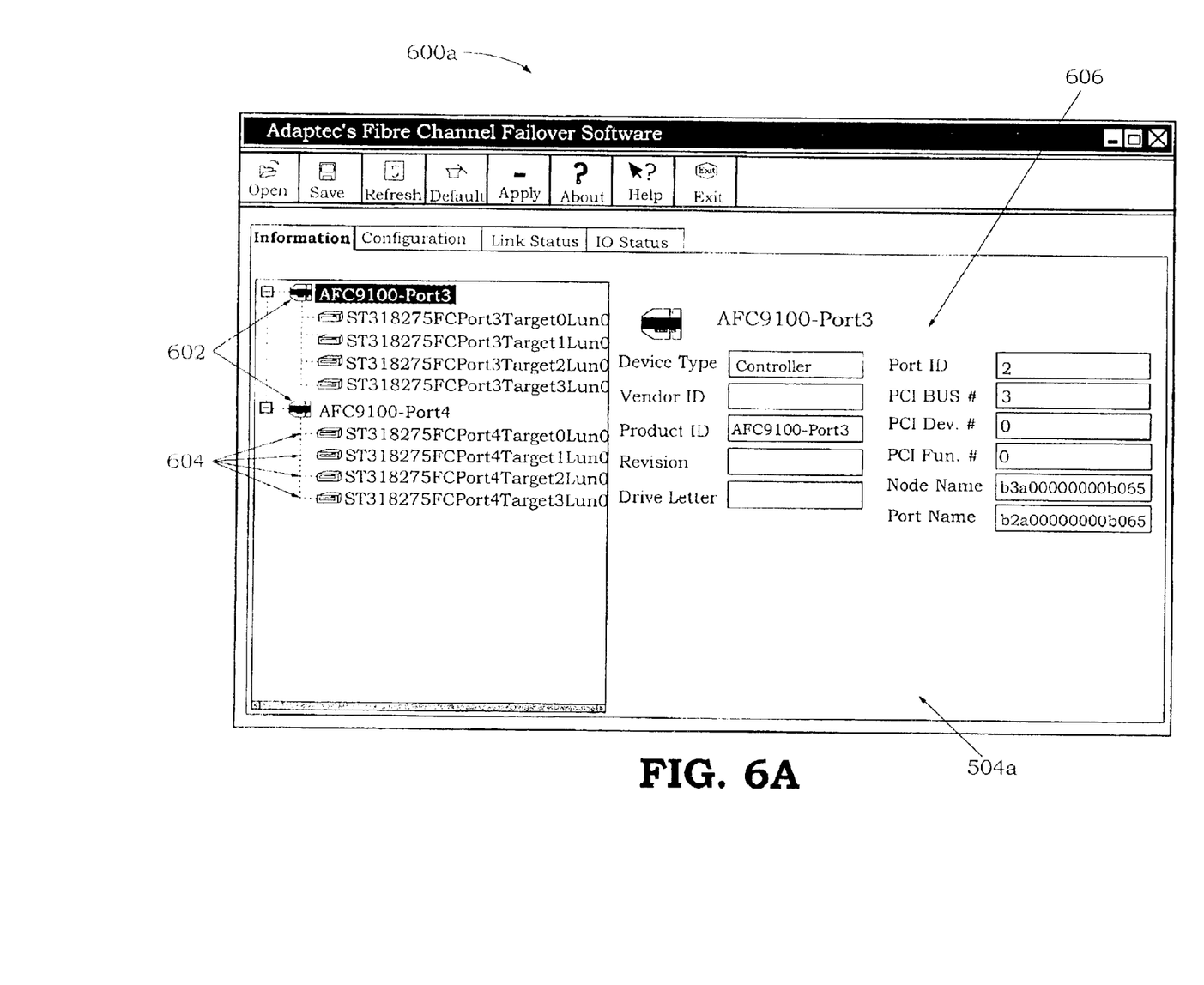
FIG. 6A is an exemplary screen shot of an information page showing host bus adapter information, in accordance with an embodiment of the present invention.
Figure 6B:
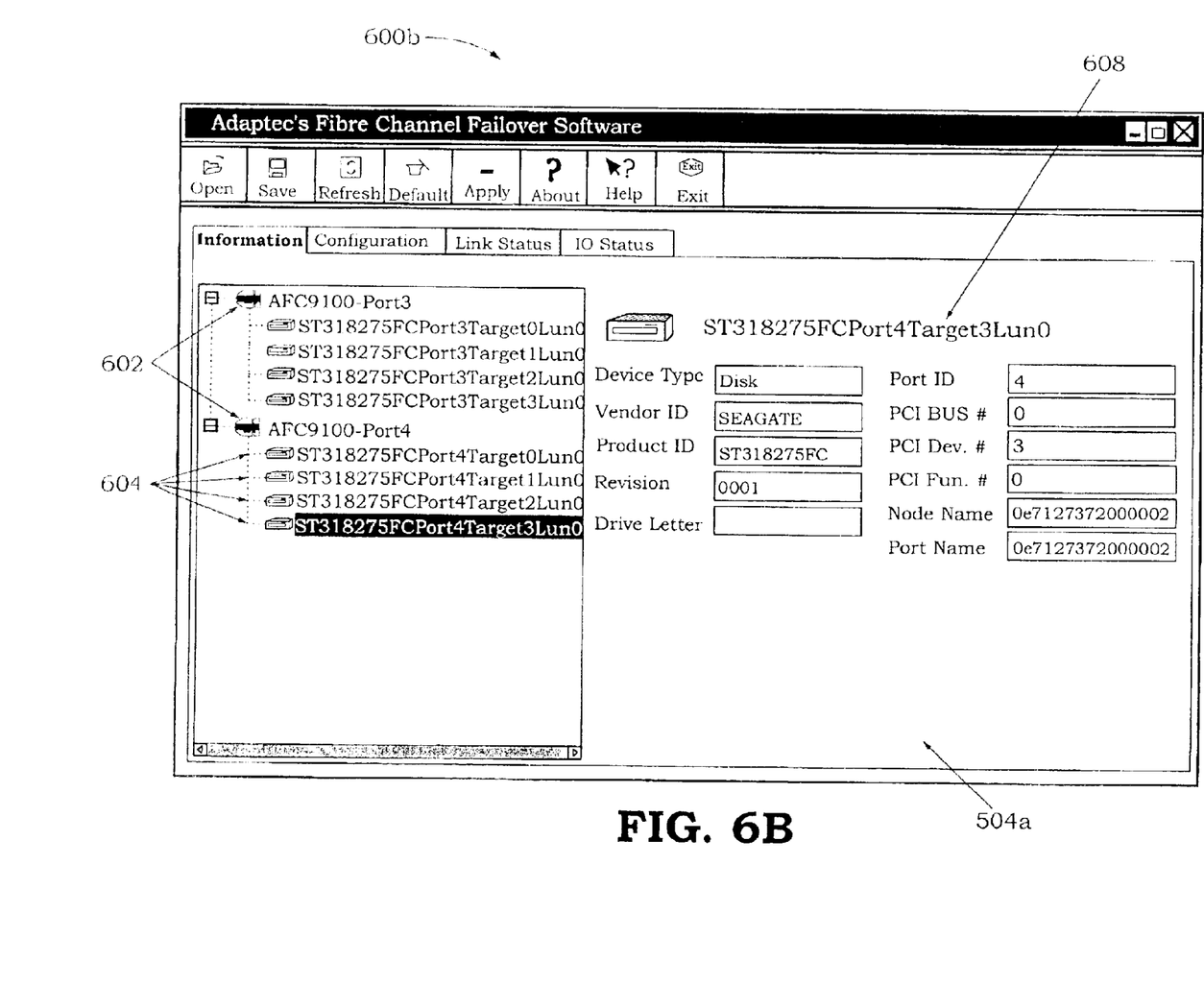
FIG. 6B is an exemplary screen shot of an information page showing device information, in accordance with an embodiment of the present invention.

FIG. 6A is an exemplary screen shot 600a of an information page 504a, in accordance with an embodiment of the present invention. The information page 504a displays the connectivity information, and generally uses a tree list structure, with host bus adapters 602 on top followed by a list of attached devices 604. By selecting a host bus adapter 602 on the tree list structure, the properties 606 of the host bus adapter 602 are displayed, The properties 606 of the host bus adapter 602 include the device type, the vendor ID, the product DD, Revision number, Port ID, PCJ BUS #, PCI Device #, PCI function #, Node name, and the Port name, In a similar manner, by selecting a device 604 on the tree list structure, the properties 608 of the device 604 are displayed, as shown screen shot 600b in FIG. 6B. The properties 608 of the device 604 include the device type, the vendor ID, the product ID, Revision number, Drive Letter, Port ID, Path ID, Target ID, LUN ID, Node name, and the Port name.

Figure 7A:
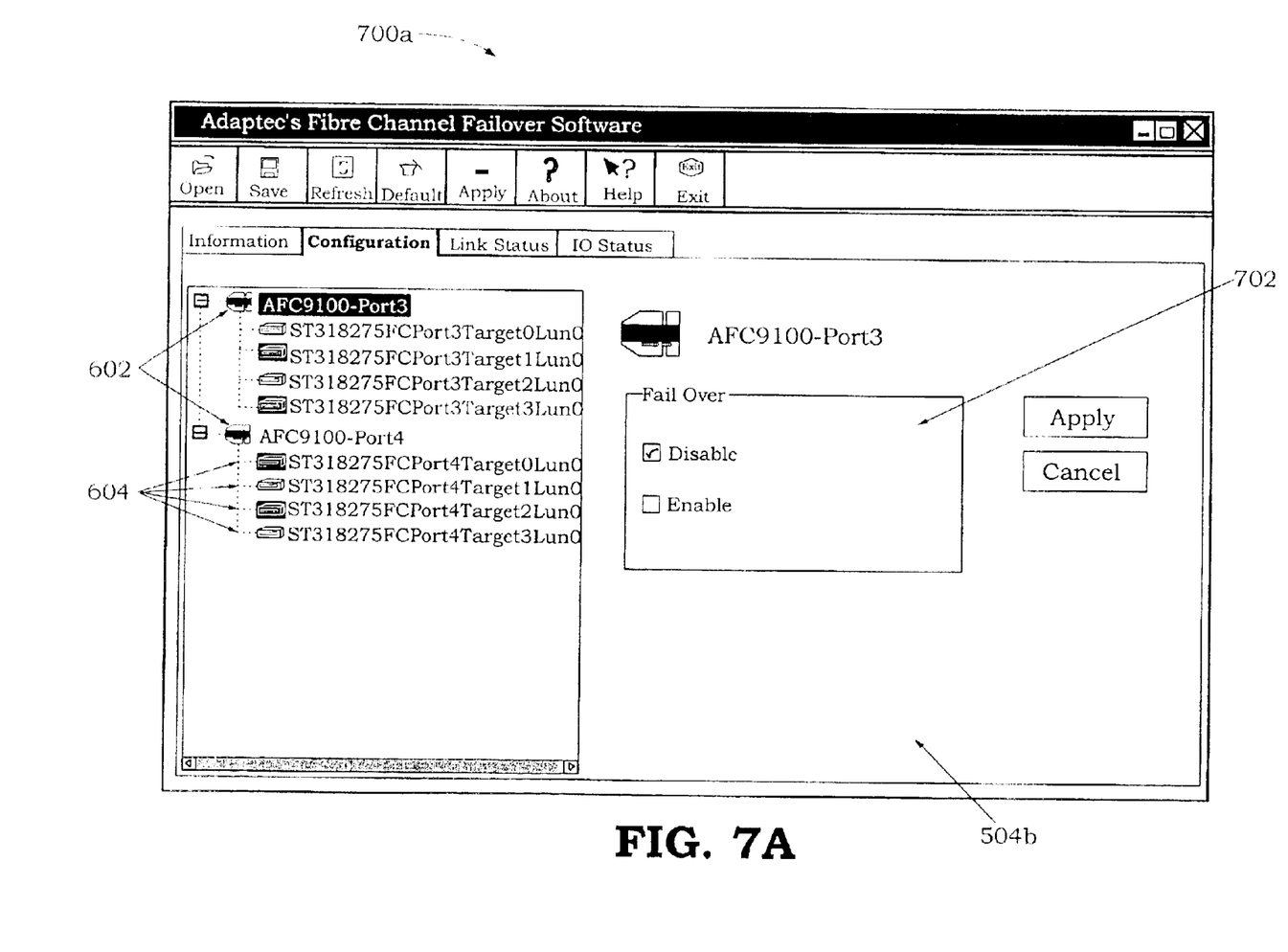
FIG. 7A is an exemplary screen shot of a configuration page, in accordance with an embodiment of the present invention.

FIG. 7A is an exemplary screen shot 700a of a configuration page 504b, in accordance with an embodiment of the, present invention. The configuration page 504b displays the current configuration, and allows the user to make changes to the current configuration. Similar to the information page 504a, the configuration page 504b generally uses a tree list structure to display information, with host bus adapters 602 on top followed by a list of attached devices 604. By selecting a host bus adapter 602 on the tree list structure, the user can determine whether the failover filter driver is enabled for the particular host bus adapter 602. Using the failover selection box 702 the user can select the appropriate box to enable or disable failover for the particular host bus adapter 602.

As previously mentioned, failover is an error recovery mechanism. For example, when two host bus adapters 602 are connected to a common storage device 604, if the primary path to the device 604 fails, then all I/O requests destined for the device are rerouted via the backup path. When the user selects enable failover, the software determines which devices connected to the selected host bus adapter have secondary data paths connecting the device to the system. These secondary data paths are then designated as a backup path to the device. When the user selects disable failover, all devices 604 connected to the selected host bus adapter 602 will generally not have a designated backup data path.

Figure 7B:
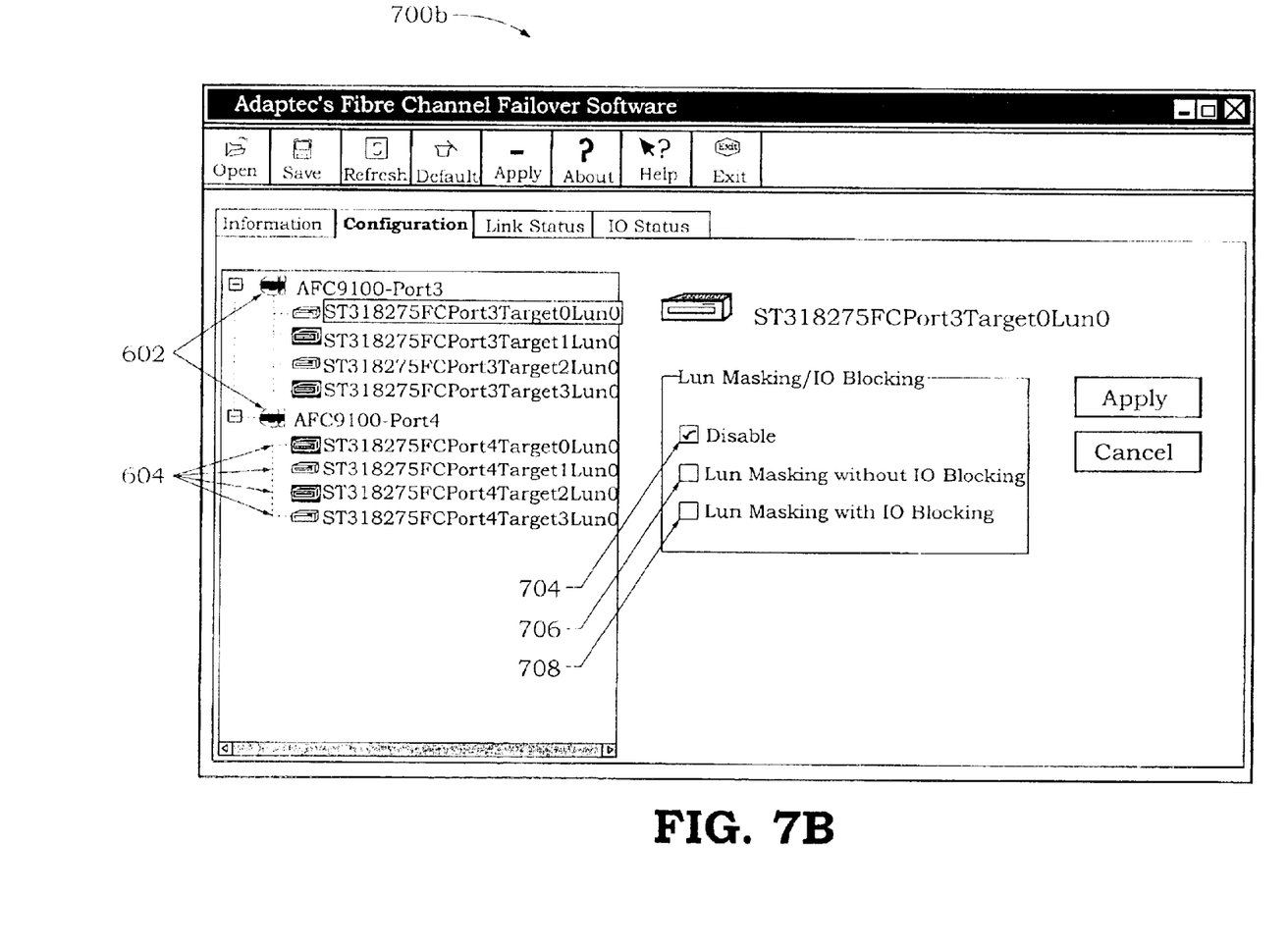
FIG. 7B is an exemplary screen shot of a configuration page showing LUN masking information, in accordance with an embodiment of the present invention.

FIG. 7B is an exemplary screen shot 700b of a configuration page 504b showing LUN masking information, in accordance with an embodiment of the present invention. When the user selects a device 604 on the configuration page 504b, LUN masking information is displayed. The LUN masking information includes a disable LUN masking box 704, a LUN masking without I/O blocking box 706, and a LUN masking with I/O blocking box 708. LUN masking is the ability to hide the device from the operating system. Two steps occur during LUN masking 1) the logical drive appearance is not reported to the operating system, and 2) I/O requests to the drive may be blocked.

By selecting the disable LUN masking box 704, the selected device will be visible to the operating system, and to all I/O requests destined for the device will be delivered. When the user selects the LUN masking without I/O blocking box 706, the logical appearance of the device will not be reported to the operating system. Hence, a drive letter will not be assigned to the device. However, I/O requests destined for the physical device will not be blocked, thus I/O requests can still be delivered to the device. When the user selects the LUN masking with I/O blocking box 708, the logical appearance of the device will not be reported to the operating system. As such, a drive letter will not be assigned to the device. In addition, I/O requests destined for the physical device will be blocked.

Figure 8:
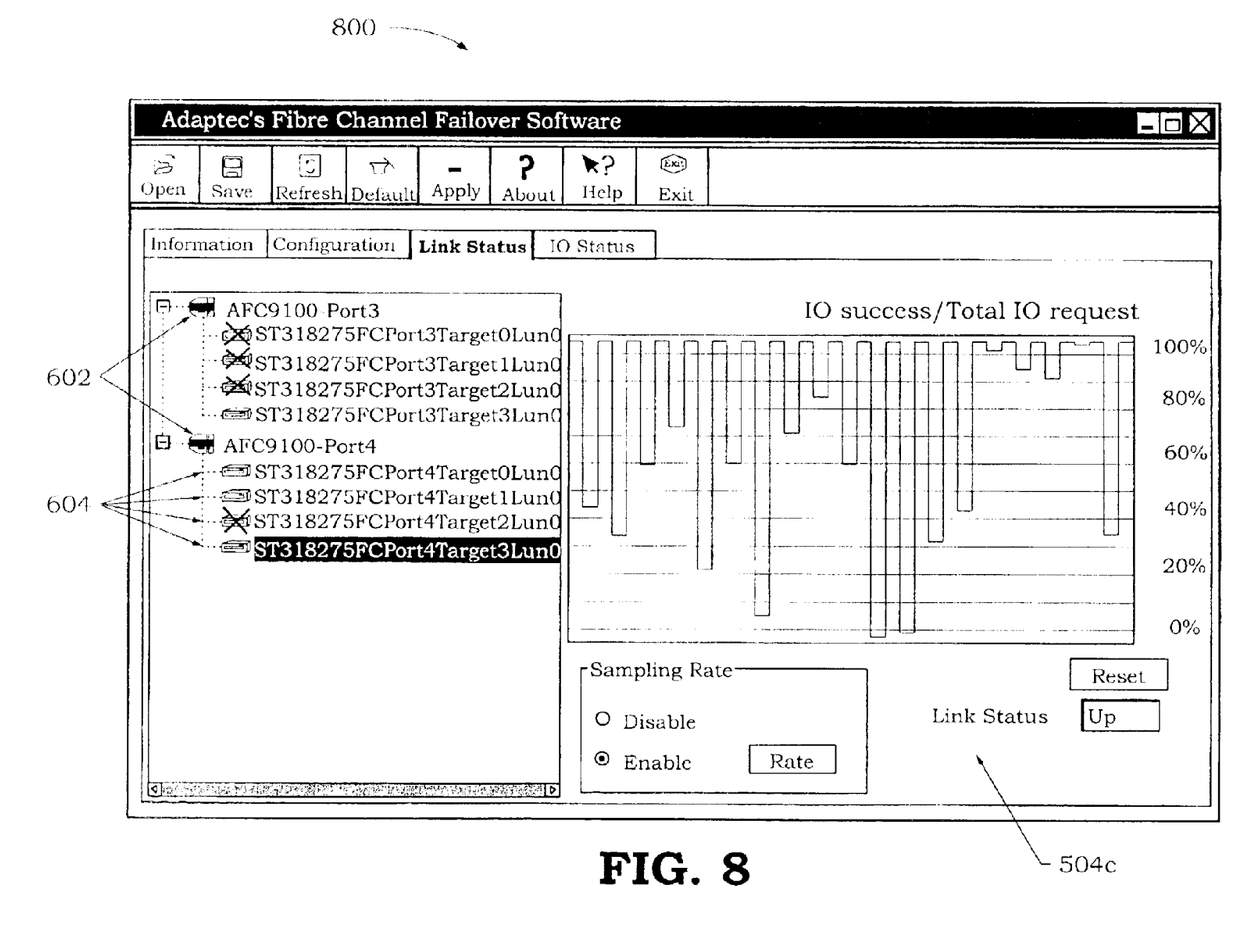
FIG. 8 is an exemplary screen shot of a Link Status page, in accordance with an embodiment of the present invention.

FIG. 8 is an exemplary screen shot 800 of a Link Status page 504c, in accordance with an embodiment of the present invention. The Link Status page 504c shows the current link status for a selected device path. The link status is displayed as the ratio of the number of successful I/O requests performed over the link to the total number of I/O requests performed over the link.

Figure 9:
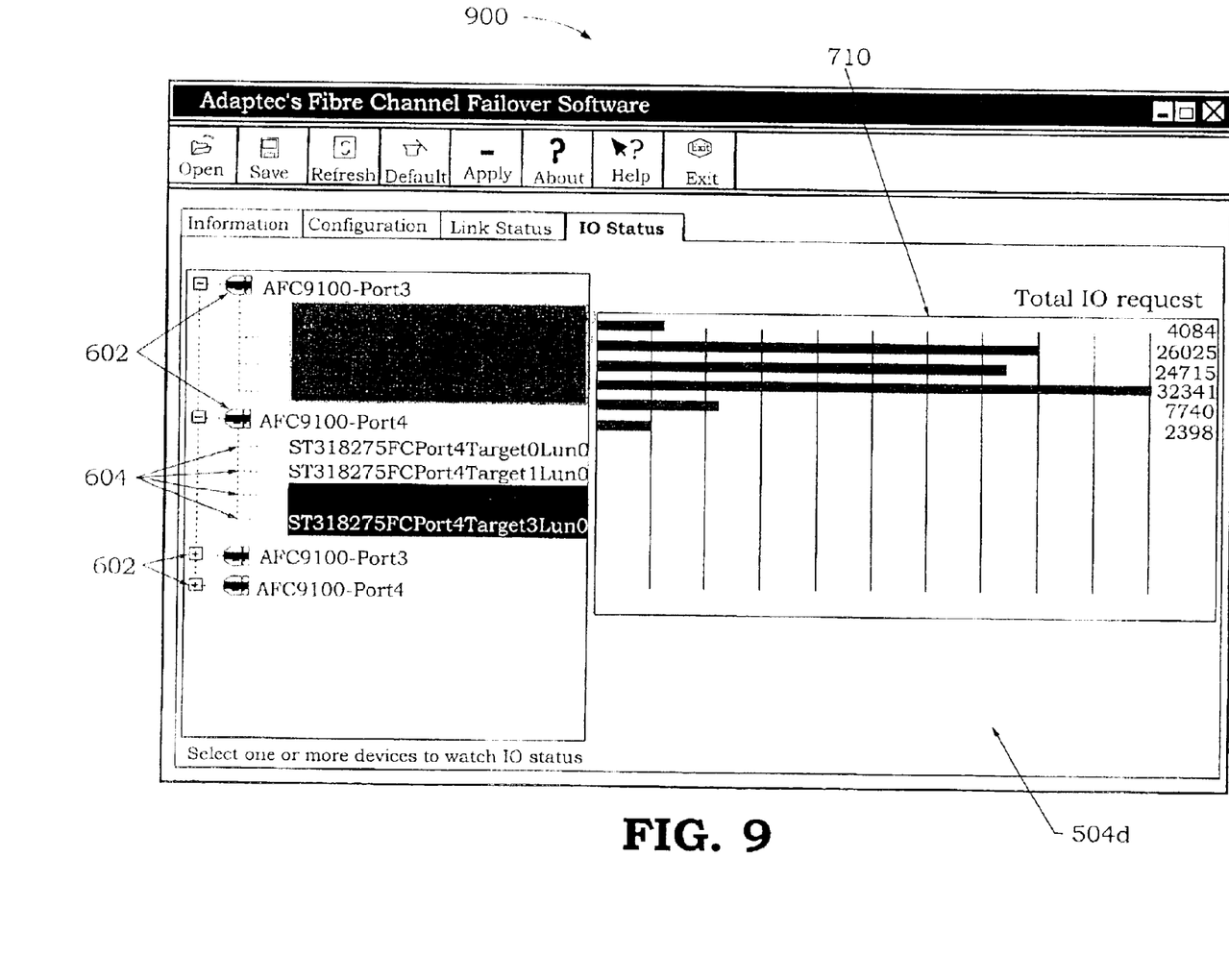
FIG. 9 is an exemplary screen shot 900 of an I/O State page 504d, in accordance with an embodiment of the present invention.

FIG. 9 is an exemplary screen shot 900 of an I/O State page 504d, in accordance with an embodiment of the present invention. The I/O State property page 504d displays the I/O status of the devices 604. When a particular device 604 is selected, the total number of I/O requests destined for the selected device is updated and displayed in the I/O status display 710. In addition, the I/O status of multiple devices can be displayed simultaneously, thus allowing easy comparison between the selected devices.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CDRs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A segregated user interface for parameter configuration in a multi-path failover system, comprising:
   a user interface module capable of receiving configuration parameters for a multi-path failover system from a user, wherein the received configuration parameters include logical unit number (LUN) masking parameters, wherein the LUN masking parameters include a LUN masking without input/output (I/O) request blocking; and
   an object module capable of receiving the configuration parameters from the user interface module, wherein the object module is capable of detecting a current controller status of a controller and a current device status of a device, and wherein the object module is further capable of configuring a failover driver using the received configuration parameters.

2. A segregated user interface as recited in claim 1, wherein the LUN masking parameters include a LUN masking with I/O request blocking.

3. A method for configuring parameters in a multi-path failover system, comprising the operations of:
   detecting a current controller status of a controller and the current device status of a device;
   displaying the current controller status and the current device status to a user;
   receiving configuration parameters for a multi-path failover system from the user, the configuration parameters including logical unit number (LUN) masking parameters, wherein the LUN masking parameters include a LUN masking without input/output (I/O) request blocking; and
   configuring a failover driver using the received configuration parameters.

4. A method as recited in claim 3, wherein the LUN masking parameters include a LUN masking with I/O request blocking.

5. A method as recited in claim 4, wherein the failover driver rejects all I/O requests destined for a device having a LUN masking with I/O request blocking.

6. A method as recited in claim 5, wherein a device having a LUN masking parameter is hidden from an operating system.

7. A system for configuring parameters in a multi-path failover system, comprising:
   a user interface module capable of receiving configuration parameters for a multi-path failover system from a user;
   an object module capable of receiving the configuration parameters from the user interface module, wherein the object module is capable of detecting a current controller status of a controller and the current device status of a device; and
   a failover driver in communication with the object module, wherein the failover driver is capable of receiving the configuration parameters from the object module, wherein the failover driver is configured using the received configuration parameters,
   wherein the multi-path failover system is configured to direct I/O requests to storage devices, and the multi-paths communicate with the storage devices;
   wherein the failover driver is further configured to detect the multi-paths and to determine prior and current status of the multi-paths; and
   wherein the failover driver is further configured to calculate a failure probability for each detected path based on the respective prior and current status of the multi-path and to select, for the communication with the storage device, the path having a lowest probability of failure.

8. A system for configuring parameters in a multi-path failover system, comprising:
   a user interface module capable of receiving configuration parameters for a multi-path failover system from a user, wherein the configuration parameters include logical unit number (LUN) masking parameters, wherein the LUN masking parameters include a LUN masking without input/output (I/O) request blocking;
   an object module capable of receiving the configuration parameters from the user interface module, wherein the object module is capable of detecting a current controller status of a controller and the current device status of a device; and a failover driver in communication with the object module, wherein the failover driver is capable of receiving the configuration parameters from the object module, wherein the failover driver is configured using the received configuration parameters.

9. A system as recited in claim 8, wherein the LUN masking parameters include a LUN masking with I/O request blocking.

10. A segregated user interface for parameter configuration in a multi-path failover system, comprising:

a user interface module capable of receiving configuration parameters for a multi-path failover system from a user, the user interface module further capable of displaying a current controller status and a current device status; and an object module capable of receiving the configuration parameters from the user interface module, wherein the object module is capable of detecting a current controller status of a controller and the current device status of a device, and wherein the object module is further capable of configuring a failover driver using the received configuration parameters, wherein the configuration parameters include a LUN masking without input/output (I/O) request blocking parameter and a LUN masking with I/O request blocking parameter.

11. A segregated user interface as recited in claim 10, wherein the object module is capable of disabling and enabling failover features for a particular data path.

12. A segregated user interface as recited in claim 11, wherein the failover features represent an ability to reroute an I/O request destined for a particular I/O device when a primary data path to the I/O device has failed.

13. A method for configuring parameters in a multi-path failover system, comprising the operations of:

detecting a current controller status of a controller and the current device status of a device;

displaying the current controller status and the current device status to a user;

receiving configuration parameters for a multi-path failover system from the user, the configuration parameters including a LUN masking without input/output (I/O) request blocking parameter and a LUN masking with I/O request blocking parameter; and configuring a failover driver using the received configuration parameters such that the failover driver rejects all I/O requests destined for a device having a LUN masking with I/O request blocking, and wherein a device having a LUN masking parameter is hidden from an operating system.

14. A method as recited in claim 13, further comprising the operation of disabling and enabling failover features for a particular data path.

15. A method as recited in claim 14, wherein the failover features represent an ability to reroute an I/O request destined for a particular I/O device when a primary data path to the I/O device has failed.

16. A system for configuring parameters in a multi-path failover system, comprising:

a user interface module capable of receiving configuration parameters for a multi-path failover system from a user, the user interface module further capable of displaying a current controller status and a current device status;

an object module capable of receiving the configuration parameters from the user interface module, wherein the object module is capable of detecting a current controller status of a controller and the current device status of a device, wherein the configuration parameters include a LUN masking without input/output (I/O) request blocking parameter and a LUN masking with I/O request blocking parameter; and a failover driver in communication with the object module, wherein the failover driver is capable of receiving the configuration parameters from the object module, wherein the failover driver is configured using the received configuration parameters.

17. A system as recited in claim 16, wherein the failover driver is capable of receiving disable and enable failover parameters for a particular data path from the object module.

18. A system as recited in claim 17, wherein the failover driver reroutes I/O requests destined for a particular I/O device when a primary data path to the I/O device has failed in response to receiving an enable failover parameter.

19. A method for providing an interface to a failover driver, comprising the operation of:

providing a segregated user interface, the segregated user interface having a front end to receive user commands and a back end to provide configuration commands to a failover driver, wherein configuration parameters include logical unit number (LUN) masking parameters, wherein the LUN masking parameters include a LUN masking without input/output (I/O) request blocking.

20. A method as recited in claim 19, wherein the LUN masking parameters include a LUN masking with I/O request blocking.

* * * * *